United States Patent [19]

Hooker

[11] 4,114,486

[45] Sep. 19, 1978

[54] LATHE FOR GENERATING SPHERICAL OR ASPHERICAL SURFACES ON WORKPIECES, METHOD FOR GENERATING ASPHERICAL SURFACES ON WORKPIECES AND WORKPIECE HAVING ASPHERICAL SURFACE

[75] Inventor: Derrell C. Hooker, Lancaster, Ohio

[73] Assignee: Aspheric Associates, Ltd., Lancaster, Ohio

[21] Appl. No.: 718,583

[22] Filed: Aug. 30, 1976

Related U.S. Application Data

[63] Continuation-in-part of Ser. No. 568,718, Apr. 16, 1975, Pat. No. 3,977,279.

[51] Int. Cl.² ............................................. B23B 5/40
[52] U.S. Cl. ........................................ 82/12; 51/124 L
[58] Field of Search ............................ 82/12, 11, 1 C; 51/124 L, 101 LG, 217 L

[56] References Cited

U.S. PATENT DOCUMENTS

| 3,079,732 | 3/1963 | Rawstron et al. | 82/12 |
| 3,301,104 | 1/1967 | Matlack | 82/12 |
| 3,881,378 | 5/1975 | Bettiol | 82/12 |
| 3,900,971 | 8/1975 | Brueck | 51/124 L |
| 3,913,274 | 10/1975 | Raiford et al. | 82/12 |

FOREIGN PATENT DOCUMENTS 42,579 10/1959 German Democratic Rep. ......... 82/12

*Primary Examiner*—Leonidas Vlachos
*Attorney, Agent, or Firm*—Mahoney & Stebens

[57] ABSTRACT

A lathe for generating spherical surfaces of selected radiis on workpieces in the usual manner but which is provided with curve-selecting adjustable means for generating aspherical surfaces which deviate from the spherical surfaces in a predetermined relationship. The lathe is provided with a spindle which carries the workpiece for rotation about its axis and a feed carriage which carries a suitable surface forming tool for swinging about a fixed pivot in contact with the face or surface of the workpiece. The feed carriage for supporting the tool includes means for supporting it for axial floating movement into contact with the surface of the workpiece. The curve-selecting adjustable means for causing deviations from spherical in the surface produced on the workpiece includes a mechanical linkage having a link pivotably interconnected to the feed carriage along its centerline which passes through the fixed pivot, and to a mount positioned in predetermined relationship to the fixed pivot. It also includes means for supporting the link mount for adjustment selectively in either or both of two directions, relative to the fixed pivot, in the direction of the axis of rotation of the workpiece or at a right angle thereto. This invention also provides a method for generating aspherical surfaces on workpieces and the workpieces with such surfaces.

13 Claims, 10 Drawing Figures

LATHE FOR GENERATING SPHERICAL OR ASPHERICAL SURFACES ON WORKPIECES, METHOD FOR GENERATING ASPHERICAL SURFACES ON WORKPIECES AND WORKPIECE HAVING ASPHERICAL SURFACE

CROSS-REFERENCES

The subject matter of this invention relates to the invention disclosure in my copending application of the same title, and is a continuation-in-part of Ser. No. 568,718, filed Apr. 16, 1975 and now U.S. Pat. No. 3,977,279.

BACKGROUND OF THE INVENTION

This invention is particularly applicable to the generating of selected predetermined curvatures on the faces of lens blanks although it can be used in generating curvatures on surfaces of any workpieces to be used for producing various articles. The surface generating tool may be a cutting tool, a grinding tool or various other tools which will produce the desired surface curvature as it is swung across the workpiece in contact with the surface thereof while the workpiece is simultaneously rotated about its own axis.

At the present time, it is customary to use ordinary lathes for producing spherical surfaces on plastic contact lenses. The lens blank is rotated about its axis and the usual cutting tool is swung about a fixed pivot in contact with the lens blank to impart the desired spherical curvature to the surface of the lens blank. This is accomplished by swinging the feed carriage which carries the cutting tool about its fixed pivot in the usual manner. There is a need for a lathe for generating an aspherical surface curvature on the lens blank so that the resulting contact lens will more properly fit the eyeball which is not spherical.

SUMMARY OF THE INVENTION

This invention provides a lathe which is so constructed that it can produce spherical or aspherical surfaces of selected curvatures on lens blanks or other workpieces. It also provides a method of generating aspherical surfaces on workpieces as well as the workpieces with aspherical surfaces.

The present invention provides a lathe which includes the usual spindle arrangement for supporting the workpiece for rotation about its own axis and for so rotating it. It includes a feed carriage which is adapted to carry the cutting tool and which is provided with the usual longitudinally adjustable base slide and the transversely adjustable cross slide carried thereby to provide for proper location of the cutting tool relative to the workpiece carried by the spindle. The tool supporting subcarriage itself is pivoted to the transversely adjustable upper slide by a pivot structure thereon and is rotated about the axis thereof by the usual means to gradually feed or swing the tool across the face of the workpiece.

The tool-supporting subcarriage is of special construction, according to this invention, so that the lathe can be adapted to the cutting of aspherical surfaces on the workpiece. For this purpose, the tool subcarriage itself is provided with a slide mounted for floating sliding movement so it can be reciprocated along an axis and thereby advanced or retracted relative to the workpiece carried by the spindle.

The path of the tool across the face of the workpiece, as the tool carriage is swung about said pivot, is determined by a mechanical linkage which is provided according to this invention. This linkage includes a link which is pivotably connected to a mount supported on the upper slide adjacent the tool carriage and to the tool slide. The tool slide carries a connecting bar at the centerline of the tool carriage and to which the link is pivoted. This connecting bar is axially adjustable relative to the tool slide to a selected position. The link mount is supported on the cross slide by a double-slide arrangement, one being adjustable parallel to the axis of the spindle and the other being adjustable at a right angle to the axis of the spindle.

With these adjustments, the link pivots can be adjusted forwardly and rearwardly relative to the tool subcarriage pivot or laterally relative thereto. If the link mount pivot is adjusted to a position concentric with the subcarriage pivot, a spherical curve will be generated on the workpiece since there will be no advancing or retracting of the tool as it swings across the face of the workpiece. If the link mount pivot is adjusted to any other position relative to the pivot, an aspherical surface will be generated on the workpiece as the tool slide is advance or retracted due to the progressive variance in distance between the subcarriage pivot axis and the link mount pivot axis.

These and other objects and advantages of this invention will be readily apparent from the following detailed description of an embodiment thereof and the accompanying drawings.

BRIEF DESCRIPTION OF THE DRAWINGS

The best mode contemplated in carrying out this invention is illustrated in the accompanying drawings in which.

DESCRIPTION OF THE ILLUSTRATIVE EMBODIMENT

Figure 1:
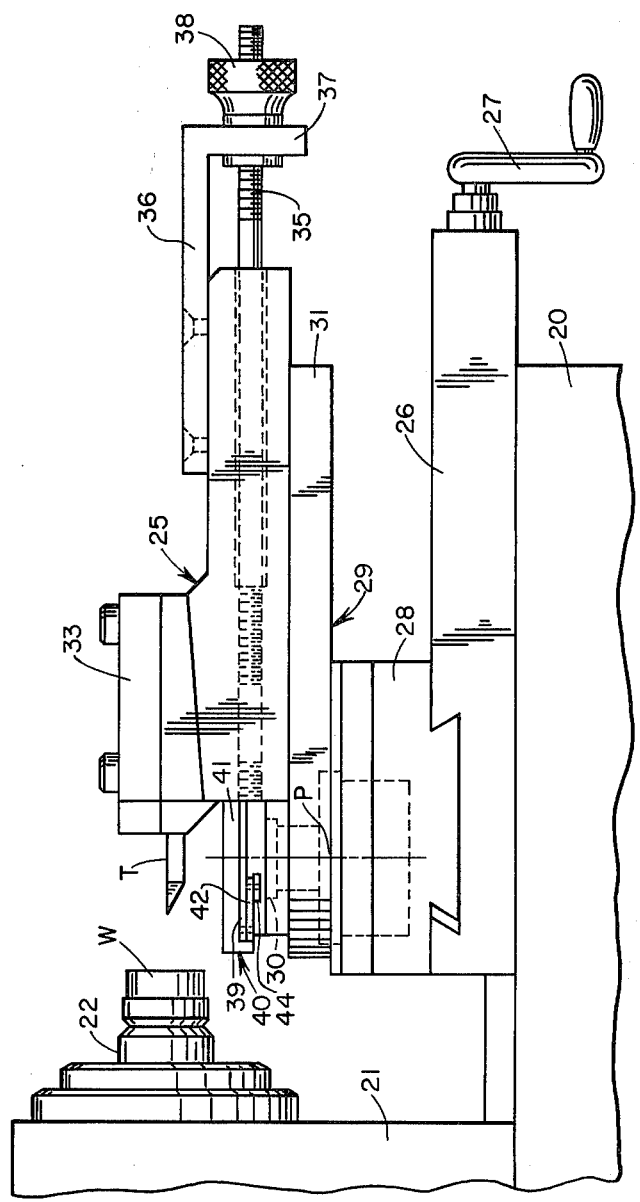
FIG. 1 is a side elevational view of a lathe embodying this invention.
Figure 2:
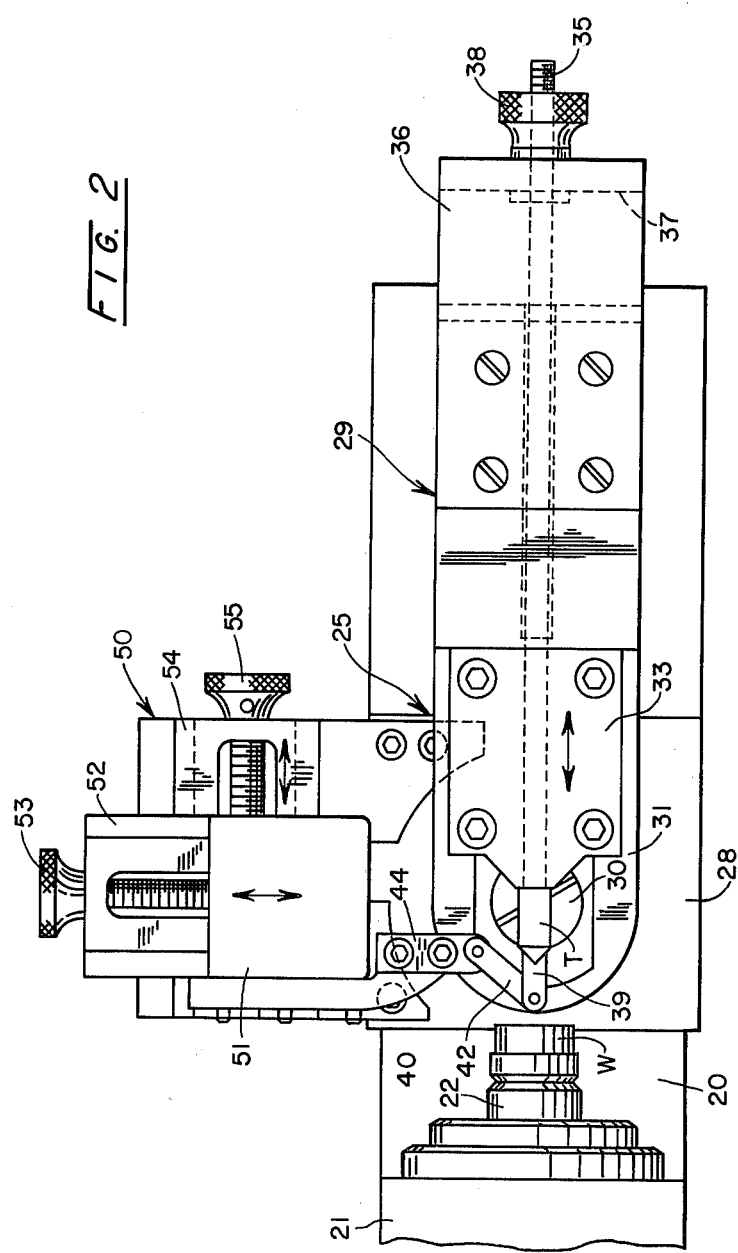
FIG. 2 is a plan view of the lathe.

With specific reference to FIGS. 1 and 2, a lathe embodying the present invention is indicated as comprising a supporting frame 20 which has spindle support unit or upstanding head 21 at one side and projecting horizontally outwardly from this head is a spindle chuck 22 which is rotated about its axis by suitable gearing within the head. This spindle chuck carries a workpiece, which is indicated as being a lens blank W, but may be any other workpiece having a face upon which a desired curvature is to be generated.

Opposite the head 21 on the frame 20 is the tool and feed carriage unit which is indicated generally by the numeral 25. This unit is indicated as comprising a base slide 26 which is longitudinally adjustable on the frame 20, along the spindle axis towards and from the spindle head 21, by means of a crank 27. Carried on the base slide 26 is a transversely adjustable upper or cross slide 28, which is adjusted in the usual manner by similar crank means (not shown). A tool-supporting subcarriage 29 is located above the upper surface of the slide 28 and is pivoted thereto by a pivot structure 30 having a vertical pivot axis P. The subcarriage 29 may be manually rotated about the axis P of pivot 30 to swing the subcarriage 29 gradually about the pivot axis P.

The tool subcarriage 29 is of special construction according to this invention. It comprises a lower support plate 31 horizontally disposed above the slide 28 and pivoted thereto by the pivot 30. It extends outwardly from the slide 28 and has mounted on the upper surface thereof a tool carrying slide 32. The tool carrying slide 32 is mounted on the plate 31 by suitable means such as the well known dovetail ways (not shown) for horizontal reciprocating movement with respect to the pivot axis P and thus forms a floating means for support of a tool member. The slide 32 has a tool chuck 33 at its upper side for clamping a cutting tool T in position to project toward the workpiece W carried by the spindle chuck 22.

Extending horizontally through the tool carrying slide 32 is an elongated connecting bar 34 which is reciprocably movable in a guideway disposed parallel to the axis of movement of the tool slide on the plate 31. One end of the bar 34 projects outwardly from the slide 32 and has a screw-threaded rod 35 secured thereto in axially extending relationship. Attached to the tool slide 32 at the end from which the bar 34 and rod 35 project is an L-shaped bracket 36 having a vertically disposed portion 37 provided with an aperture through which the rod 35 extends. Secured in this aperture for relative rotational movement is an adjusting nut 38 that engages the rod 35. Rotation of the nut 38 thus effects reciprocation of the threaded rod 35 and interconnected bar 34 relative to the tool slide in accordance with the direction of rotation of the nut. The effect of this axial reciprocation of the bar 34 is to selectively adjust the relative extension of an end portion 39 of the bar 34 from the opposite end of the tool slide 32.

Figure 3:
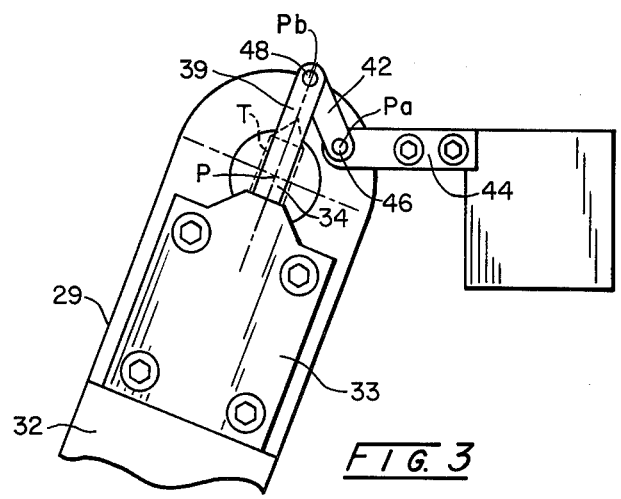
FIG. 3 is a fragmentary top plan view of the tool carriage and mechanical linkage on an enlarged scale illustrating movement of tool member in generation of a surface.

To determine or control the reciprocating movement of the tool slide 32 in accordance with this invention, a mechanical linkage designated by the numeral 40 is provided and couples the tool slide with the cross slide 28. Included in this linkage is an elongated link 42 having one end pivotally connected or coupled with the cross slide and the other end coupled with the end portion 39 of the elongated bar 34. A link mount or bracket 44 is provided for the interconnection of the link 42 to the cross slide 28. This bracket comprises an elongated bar which has a pivot pin interconnecting with the end of the link 42 and forming a first pivot having the vertical axis P$a$. The opposite end of the link is pivotally connected to the bar end portion 39 by a pivot pin 48 with its pivot axis designated P$b$. This mechanical linkage 40 can be best seen in FIG. 3 where the tool subcarriage 39 is shown angularly displaced to the longitudinal axis of the lathe about the pivot structure 30.

The link mount or bracket is carried by a double slide or double carriage arrangement 50 mounted on the cross slide 28 for adjustment in a horizontal plane longitudinally of the spindle axis or at a right angle to the spindle axis to selectively position it relative to the axis P of pivot structure 30. Thus, it will be noted that the bracket 44 has its inner end carried by a transversely movable upper slide 51 so that it projects over the plate 31. This slide 51 is mounted for transverse sliding movement on a lower slide 52, the upper slide 51 being reciprocably adjusted transversely to a selected position by means of a screw 53. The lower slide 52 is carried by a slide 54 which is mounted on the upper surface of the cross slide 28 for longitudinal movement, this adjustment being accomplished by means of a screw 55. The screws 53 and 55 may thus be used to adjust the bracket 44 laterally or rearwardly and forwardly to selectively position its pivot axis P$a$ relative to the pivot 30.

The various parts of the lathe have been described and include the floating tool-carrying slide 35 and the mechanical linkage 40 interconnecting the slide 35 with the cross slide 32 for effecting control over the movement of the tool T with respect to the workpiece W to generate a specific surface. As the tool subcarriage 29 is swung about the pivot 30, the tool T will have its contact position with the workpiece W controlled by the position of the pivot P$a$ of the bracket 44 relative to the pivot 30. As pointed out above, this position is determined by adjustment of the double slide arrangement 50 in either or both of two directions. In FIGS. 4 to 10 there are illustrated varous curvatures which can be generated by adjusting the position of the bracket pivot P$a$ relative to the pivot 30. In these Figures, for clarity the workpiece W itself is not shown and the tool chuck is not shown but the relative positions of the pivot axis P and P$a$ and the tool T are shown and the curvatures which would be generated on the workpiece W are illustrated.

It will be understood that in using the lathe, the base slide 26 will be adjusted longitudinally and the cross slide 28 will be adjusted laterally to position the tool T in contact with the face of the workpiece W initially at the outer edge of the workpiece. The double slide arrangement 50 will be adjusted to position the bracket 44 as desired and the adjusting nut 38 will be turned to extend the elongated bar 34 to project a predetermined distance from the slide 32. It will be noted that the cross slide 28 is shown as positioning the pivot axis P in intersecting relationship to the spindle axis and the axis of the surface to be generated in the workpiece W. With the spindle rotating, the tool T is gradually swung inwardly toward the center of the workpiece by swinging the tool subcarriage 29 about the pivot 30. Repeated cuts may be made as necessary through incremental advancement of the base slide 26 by turning the crank 27.

Figure 4:
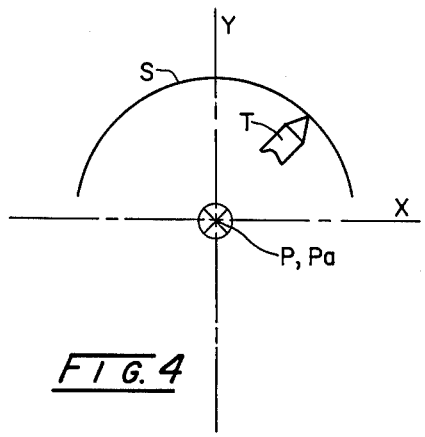
FIGS. 4–10 are diagramatical illustrations of surface configurations generated for respective linkage adjustments.
Figure 9:
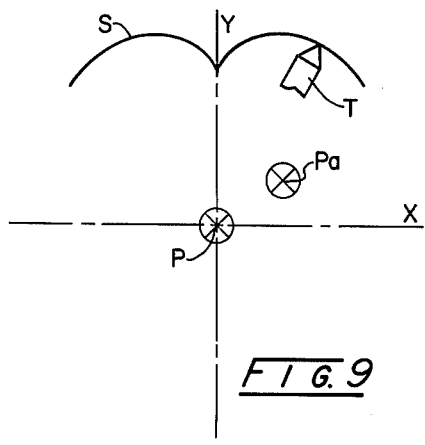

If the bracket pivot axis P$a$ is adjusted to a position as indicated in FIG. 4, where it is concentric with the axis P of the pivot 30, the resulting curvature generated on the workpiece W will be spherical. In this configuration, the link 44 is aligned with the bar end portion 39 and effectively maintains the bar in fixed relationship to the pivot P. This resulting curvature is diagramatically indicated at S by heavy lines in this Figure but it will be understood that in practice this will be the actual surface curvature generated on the workpiece W. The base curve to be produced is selected by turning the adjusting nut 38 and thereby axially displace the rod 35 and bar 34 relative to the main body structure of the tool carrying slide 32. Since the bar 34 is secured to the cross-slide 28, this relative displacement effectively positions the tool T in predetermined relationship to the pivot structure 30 and the tool T will thus traverse a circular arc of proportional radius as determined by the extent the tool projects laterally from the pivot axis P. The base radius of curvature is the distance from the tip of the tool T to the axis P of the pivot. If the tool tip is advanced toward the workpiece relative to axis P, as indicated in FIGS. 3 to 8, the surface S generated on the workpiece W will be concave. If the tool tip T is retracted to be behind the pivot axis P as indicated in FIG. 9, the surface S generated will be convex.

Referring again to FIG. 3, it will be apparent that as the tool carrying subcarriage 29 is swung about the pivot axis P of the pivot structure 30, the tip of the tool T will swing through a circular arc, since the link 42 controls the movement, and the axis Pa of the bracket 44 conincides with the pivot axis P which lies along the spindle axis A. Thus, there will be no advancing or retraction of the tool-carrying slide 32 since the bar 34 is relatively fixed with respect to the pivot axis P and will not vary during the swinging of the subcarriage 29 about the pivot axis P. Thus, the base radius of swing of the tool T about the axis P will not vary during traverse of the tool across the face of the workpiece W and, consequently, the surface S produced will be spherical. As indicated in FIG. 4, the surface is generated from the outer edge of the workpiece W inwardly as indicated by the arcs S which will be arc of a circle. The depth of surface cut into the workpiece is controlled through longitudinal displacement of the base slide 26 to generate the complete spherical surface by the concurrent rotation of the spindle 22 and workpiece W.

Figure 5:
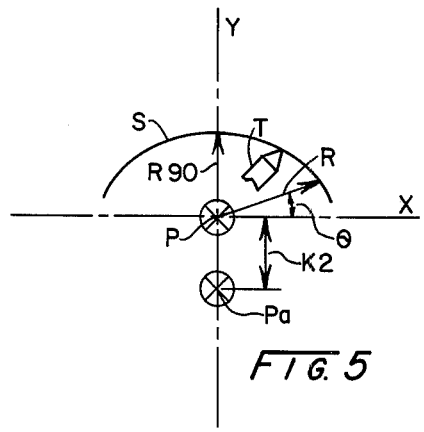

Assuming it is desired to produce an aspherical surface, the tool slide 32 is positioned by turning the adjusting nut 38 to locate the tip of the tool T at the proper distance from the pivot 30 to select the desired base curve. Then the double slide arrangement 50 is adjusted to obtain the desired departure from the spherical curvature and generate a resulting predetermined aspherical curvature. For example, assuming an elliptical curve is desired, the double slide 50 may be adjusted as indicated in FIG. 5 to produce the indicated elliptical curvature S. This is accomplished by adjusting the slide 54 rearwardly to displace the pivot axis Pa of the bracket 44 rearwardly relative to the pivot axis P and along the spindle axis A as indicated in this Figure.

With this adjustment, it will be apparent that as the subcarriage 29 swings about the pivot 30 to cause the tool to traverse the face of the rotating workpiece inwardly from its outer edge to its center, the tool T will be caused to traverse an elliptical path. This is due to the fact that since the pivot axis Pa is displaced rearwardly relative to the subcarriage pivot axis P, the link 42 will cause the tool slide 32 to move rearwardly as the subcarriage is rotated about the pivot axis P. This relative rearward displacement is in proportion to the angular rotation of the subcarriage and progressively increases as the carriage is swung from a position angularly displaced to the longitudinal axis of the spindle and workpiece to a position where it is aligned with that longitudinal axis. In these diagramtic figures, the longitudinal axis is represented as the Y-axis. While the tool T would be at the same position with respect to the X-axis as in the concentric setting of FIG. 4, the Y-axis distance with respect to the pivot axis P will be gradually decreased to the extent that the axis Pa is displaced rearwardly of the pivot axis P.

In this instance, the point of contact of the tool T will retract as the tool swings inwardly since, as indicated diagramatically in FIG. 5, this distance decreases which will be apparent from a comparison of the X and Y axis displacements with those in FIG. 4. The result is that the radius of curvature of the surface S is progressively decreased as the tool travels inwardly toward the center of the workpiece. Thus, as will be apparent from FIG. 5, the surface S will be gradually generated and the resulting surface will have an elliptical or aspherical concave curvature.

Figure 6:
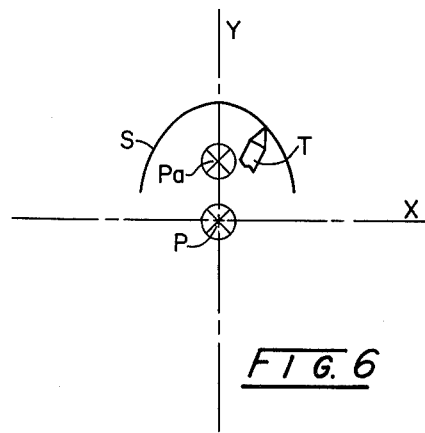
Figure 7:
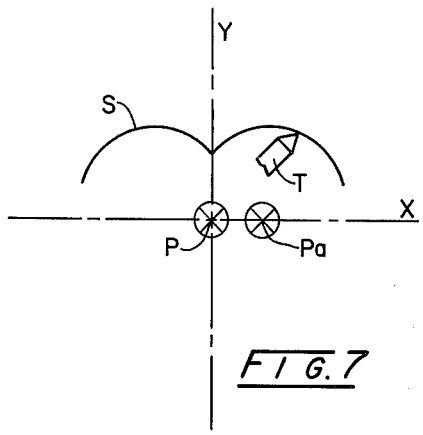
Figure 8:
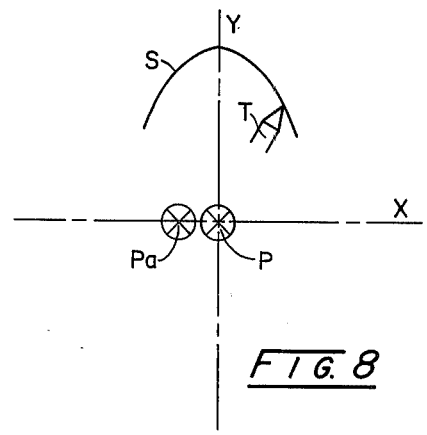

FIG. 6 illustrates the situation where the double slide arrangement 50 is adjusted to position the pivot axis Pa a distance forwardly of the subcarriage pivot axis P. As in the case of the adjustment with respect to FIG. 5, the tool T will be controlled to result in generation of an aspherical surface S in the workpiece W with this surface also having an elliptical configuration. The difference between the two surfaces that are thus generated is that in FIG. 5, the long axis of the ellipse is aligned with the X-axis whereas in FIG. 6, the long axis is aligned with the Y-axis. It will thus be readily apparent that the apparatus of this invention is capable of generating elliptical surfaces of any desired configuration through simple adjustment of the position of the one pivot axis Pa relative to the other axis P along the longitudinal or Y-axis.

As previously indicated, the double slide arrangement 50 may be laterally adjusted to displace the bracket 44 and its associated pivot axis Pa transversely relative to either side of the longitudinal or Y-axis. The effect of such lateral discplacement without longitudinal adjustment is diagramatically illustrated in FIGS. 7 and 8 where the pivot axis Pa is shown positioned to the right and the left of the Y-axis, respectfully. When displaced to the right, the surface S thus generated will have a dual concavity whereas displacement to the left results in a single concavity with an aspherical configuration.

FIG. 9 shows the effect of adjustment of the bracket 44 not only parallel to the spindle axis Y but also laterally at a right angle thereto. It will be noted that the pivot axis Pa is adjusted forwardly towards the workpiece W as well as laterally of the spindle axis Y. The result will be the generation of a double concave curve S. In this example, as the tool T swings inwardly across the face of the workpiece, the radius of curvature of the surface S, as it is developed, is gradually and progressively changed. The concave curved surface S so produced will be a combination of two identical concave surfaces which merge at the center of the workpiece.

Figure 10:
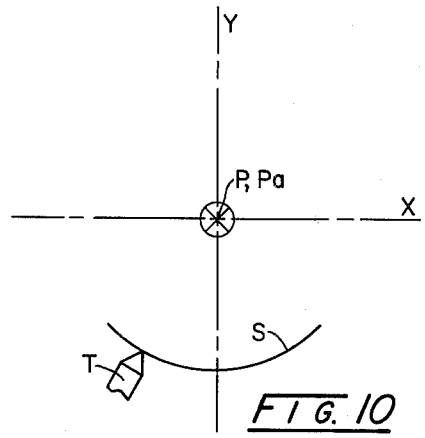

If it is desired to produce a convex surface on the workpiece W, the lathe will be so adjusted that the pivot axis P will be ahead of the cutting point of the tool as indicated in FIG. 10. This will be accomplished be adjustment of the base slide 26 to move the pivot axis P beyond the face of the workpiece toward the spindle head 21 and turning the adjusting nut 38 to cause the bar 34 to project a sufficient distance out of the tool carrying slide 32 so that the tool tip T will be located a distance behind the pivot axis P to determine the base curve. If the bracket 44 is now relatively positioned by means of the double slide arrangement 50 so that its pivot axis Pa coincides with the pivot axis P as in FIG. 4, the resulting curvature S generated on the workpiece will be spherical, since there will be no axial movement of the tool carrying slide 32 as the subcarriage 29 is swung about the pivot P. It will be understood that with the cutting point of the tool T behind the pivot P, as in FIG. 10, any other adjustment of the double slide arrangement 50 to move the pivot axis Pa out of coincidnece with the pivot axis P, will result in the generation of an aspherical convex surface on the face of the workpiece W in a manner similar to that illustrated with the concave surface generations of FIGS. 4-9.

It will be apparent from the above that this invention provides a lathe which can be used for generating spherical or aspherical surfaces. This is accomplished by using a tool carriage which is mounted for floating movement towards and from the face of the workpiece as the tool is swung about the workpiece and the double slide arrangement which carries the mechanical linkage for controlling the movement of the tool carrying slide relative to a pivot for that slide. If spherical surfaces are to be produced, the mechanical linkage is adjusted to place the pivot P*a* concentric with the tool carriage pivot P. If aspherical surfaces are to be produced, the mechanical linkage is adjusted in one or both directions to displace the pivot P*a* away from the pivot P to produce the desired deviations from spherical in the surface that is to be generated.

While the aspherical curvatures heretofor described in conjunction with the illustrative diagramatic figures have been termed "elliptical", it is to be understood that these surfaces are not true geometric ellipses. To better illustrate this characteristic, a mathematical definition has been developed for the family of curvatures that may be generated for the situations that are illustrated in FIGS. 5 and 6 and would be applicable for the circular curvature of FIG. 4. For a graphical representation of the mathematical definitions, reference may be had to FIGS. 5 and 6 which are illustrative of the curves generated when the tool point is located relatively forward of the pivot axis P. The polar equation for this situation is $$R = R_{90°} - k_1 + k_2 - k_2 \sin\theta + \sqrt{K_1^2 - k_2^2 \cos^2\theta}$$

where
$R_{90°} = R$ when $\theta$ is 90° (aligned with Y axis)
$\theta$ is the angle with respect to X axis
$k_1$ is the pivot axis length P*a*–P*b* of the link 42
$k_2$ is the offset distance between P and P*a* axis When the tool point is located relatively rearward of the pivot axis P, (the FIG. 10 situation) this polar equation becomes $$R = R_{90°} + k_1 + k_2 \sin\theta - \sqrt{k_1^2 - k_2^2 \cos^2\theta}$$

The lathe illustrated and described is of the conventional configuration where the workpiece is mounted on a fixed spindle. However, it is to be understood that a reverse arrangement of the tool and spindle supports could be provided, that is, the tool could be fixed axially and the workpiece could be mounted for the floating movement relative to the tool.

The specific dimensions of the several components will depend upon the magnitude of the surfaces that are to be generated by a particular machine; this, in turn, depending upon the nature of the workpiece. The length of the link 42 in the mechanical linkage will be such that the lathe can properly function.

In the above description, a lathe has been given as the best means contemplated in carrying out this invention. However, it is to be understood that the mechanical linkage and double-slide or carriage adjusting unit can be applied to other surfaces generating machines where it is desired to control the relative movements of a workpiece and forming tool, such as a grinder or a milling machine. Also, the tool may not be of the cutting type disclosed, but may be a grinding or abrading type or other surface-forming types. The size of the workpiece is not critical and may be small or large.

Having thus described this invention, what is claimed is:

1. A machine for generating a surface on a workpiece comprising
   a spindle support unit supporting a spindle member carrying a workpiece for rotation about an axis extending through the workpiece,
   means for rotating said spindle,
   a tool-supporting unit for supporting a tool member in operative relationship with a face of the workpiece,
   one of said units including a support therefor having a support pivot located along said axis for enabling relative swinging movement of the tool member across the face of the workpiece to generate a surface thereon, said support including
   floating means carried thereon for floating movement relative to said pivot so that the member carried thereby may be advanced or retracted relative to the pivot and the member of the other unit, and
   a mechanical linkage for controlling the movement of the member carried by said floating means, said linkage including a link having a first pivot secured to the unit carrying said floating means, in predetermined relationship to said support pivot and a second pivot connected to said floating means.

2. A machine according to claim 1 wherein said link first pivot is selectively adjustable relative to said support pivot to said predetermined position.

3. A machine according to claim 2 wherein said link first pivot is selectively adjustable in a direction parallel to said axis of rotation.

4. A machine according to claim 2 wherein said link first pivot is selectively adjustable in a direction transverse to said axis of rotation.

5. A machine according to claim 2 wherein said link first pivot is selectively adjustable in directions parallel and transverse to said axis of rotation.

6. A machine according to claim 2 wherein said link first pivot is selectively adjustable to a position where the axis thereof is coincident with that of said support pivot.

7. A machine according to claim 1 wherein said floating means includes an elongated bar mounted thereon for relative reciprocating movement and having said link second pivot connected thereto, and adjusting means for selectively positioning said bar along its path of reciprocation.

8. A machine according to claim 7 wherein the path of reciprocation of said bar extends through said support pivot in transverse relationship to the axis thereof.

9. A machine according to claim 7 wherein said floating means includes a subcarriage mounted for rotation about said support pivot, and a tool carrying slide mounted on said subcarriage for relative reciprocating movement along an axis extending through and transversely oriented to the axis of said support pivot, said elongated bar mounted on said tool carrying slide with said adjusting means interconnecting said bar and said tool carrying slide.

10. A machine according to claim 9 wherein said tool carrying slide carries the tool member and is selectively positionable to position the tool member at either side of said support pivot.

11. A machine according to claim 1 which includes a double carriage adjustable relative to the axis of said support pivot in two directions in a plane oriented transverse to the axis of said support pivot, said first link pivot mounted on said double carriage.

13. A machine according to claim 1 wherein one of said units is mounted on a base slide for selective reciprocating movement relative to the other.

13. A machine according to claim 12 wherein one of said units is mounted on a cross slide for selective reciprocating movement relative to the path of movement of said base slide.

* * * * *